US007253961B2

(12) United States Patent
Miyazawa (10) Patent No.: US 7,253,961 B2
(45) Date of Patent: Aug. 7, 2007

(54) ZOOM LENS SYSTEM AND IMAGE PICKUP APPARATUS INCLUDING THE SAME

(75) Inventor: Nobuyuki Miyazawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/299,208

(22) Filed: Dec. 9, 2005

(65) Prior Publication Data
US 2006/0139764 A1    Jun. 29, 2006

(30) Foreign Application Priority Data
Dec. 28, 2004    (JP)    ............... 2004-380724

(51) Int. Cl.
*G02B 15/14*    (2006.01)
(52) U.S. Cl. ..................... 359/683; 359/684
(58) Field of Classification Search ................ 359/683, 359/684, 676
See application file for complete search history.

(56) References Cited

U.S. PATENT DOCUMENTS 4,501,475 A * 2/1985 Fujita et al. ................. 359/683
5,388,004 A   2/1995 Adachi
5,530,592 A   6/1996 Tochigi
5,880,892 A * 3/1999 Ohtake ........................ 359/683
5,973,854 A * 10/1999 Shimo ........................ 359/676
2004/0125462 A1* 7/2004 Misaka ........................ 359/684

FOREIGN PATENT DOCUMENTS

| JP | 5-215967 A   | 8/1993  |
| JP | 6-317752 A   | 11/1994 |
| JP | 2000-180724 A | 6/2000  |
| JP | 2002-365547 A | 12/2002 |

* cited by examiner

*Primary Examiner*—Scott J. Sugarman
(74) *Attorney, Agent, or Firm*—Canon U.S.A., Inc. IP Division (57) ABSTRACT

At least one exemplary embodiment is directed to a zoom lens system which includes, in order from an object side to an image side, a first lens unit with positive optical power, a second lens unit with negative optical power, a third lens unit with positive optical power, a fourth lens unit with positive or negative optical power, and a fifth lens unit with positive optical power. In at least one exemplary embodiment of this zoom lens system, during zooming, the second lens unit, the third lens unit, and the fifth lens unit can move along the optical axis.

20 Claims, 7 Drawing Sheets

ZOOM LENS SYSTEM AND IMAGE PICKUP APPARATUS INCLUDING THE SAME

BACKGROUND OF THE INVENTION

1. Field of the Invention

The present invention relates to a zoom lens system and more particularly, though not exclusively, to an image pickup apparatus including the zoom lens system.

2. Description of the Related Art

Conventionally, with respect to zoom lens systems used in photographic cameras, camcorders, and other image pickup systems, various zoom lens systems adopt a system that performs focusing by moving a lens unit behind a first lens unit, which is adjacent to an object side (the lens unit is nearer to an image side than the first lens unit is). Such a system is referred to as a rear focusing system.

The rear focusing system has attractive features in that the relatively compact and lightweight lens unit can be moved a small amount. Additionally, because rear focusing can be performed quickly, the rear focusing system can be used for an auto focusing systems.

A rear focusing zoom lens system, including five lens units, is discussed in, for example, Japanese Patent Laid-Open Nos. 5-215967 (corresponding to U.S. Pat. No. 5,388,004), 6-317752 (corresponding to U.S. Pat. No. 5,530,592), and 2000-180724.

The zoom lens system that has five lens units discussed in Japanese Patent Laid-Open No. 5-215967 includes, in order from an object side to an image side, a first lens unit with positive refractive power, a second lens unit with negative refractive power, a third lens unit with positive refractive power, a fourth lens unit with negative refractive power, and a fifth lens unit. In this zoom lens system, magnification is mainly varied by moving the second lens unit along the optical axis, and displacements of the position of an image occurring when the magnification is varied are compensated by moving the fifth lens unit along the optical axis. In addition, at least one of the third lens unit and the fourth lens unit is moved during zooming. Focusing is performed by moving at least one of the third to fifth lens units.

The zoom lens system that has five lens units discussed in Japanese Patent Laid-Open No. 6-317752 includes, in order from an object side to an image side, a first lens unit with positive refractive power, a second lens unit with negative refractive power, a third lens unit with positive refractive power, a fourth lens unit with positive refractive power, and a fifth lens unit with positive refractive power. In this zoom lens system, during zooming from a wide-angle end to a telephoto end, the second lens unit is moved toward the image side and the third and fourth lens units are moved. Focusing is performed by moving the fourth lens unit.

The zoom lens system that has five lens units discussed in Japanese Patent Laid-Open No. 2000-180724 includes, in order from an object side to an image side, a first lens unit with positive refractive power, a second lens unit with negative refractive power, a third lens unit, a fourth lens unit with positive refractive power, and a fifth lens unit. In this zoom lens system, magnification is varied by moving the second lens unit, and displacements of the position of an image occurring when the magnification is varied are compensated by moving the third lens unit. Focusing is performed by moving the fifth lens unit.

Furthermore, another zoom lens system that has five lens units is discussed in, for example, Japanese Patent Laid-Open No. 2002-365547. This zoom lens system includes, in order from an object side to an image side, a first lens unit with positive refractive power, a second lens unit with negative refractive power, a third lens unit with positive refractive power, a fourth lens unit with negative refractive power, and a fifth lens unit with positive refractive power. In this zoom lens system, the first to fifth lens units are moved during zooming from a wide-angle end to a telephoto end.

With a reduced distance between pixels of an image pickup device, recent zoom lens systems used in optical devices (e.g., digital camera, camcorders, and personal digital assistants (PDAs)), require higher optical performance, smaller entire lens length, and a more compact size.

For a general zoom lens, increasing refractive power of each lens unit can reduce the amount of movement of each lens unit to obtain a predetermined zoom ratio, thus facilitating the reduction of the entire lens length.

However, if the refractive power of each lens unit is simply increased, aberration occurring during zooming is inevitably increased. This makes it difficult to obtain high optical performance over the entire zoom range.

SUMMARY OF THE INVENTION

At least one exemplary embodiment is directed to a zoom lens system that is used in an electronic camera (e.g., a camcorder and a digital still camera), a film camera, and a broadcast camera, and facilitates increased optical performance over the entire zoom range.

A zoom lens system according to an exemplary embodiment includes, in order from an object side to an image side, a first lens unit with positive optical power (the reciprocal of its focal length), a second lens unit with negative optical power, a third lens unit with positive optical power, a fourth lens unit, and a fifth lens unit with positive optical power. In this zoom lens system, the second, the third, and the fifth lens units move during zooming.

Further features of the present invention will become apparent from the following description of exemplary embodiments with reference to the attached drawings.

DESCRIPTION OF THE EMBODIMENTS

The following description of exemplary embodiment(s) is merely illustrative in nature and is in no way intended to limit the invention, its application, or uses.

Exemplary embodiments can be operatively connected to various image pickup devices/apparatus (e.g., electronic cameras, camcorders, digital still cameras, film cameras, broadcast cameras, other imaging devices as known by one of ordinary skill, and equivalents) forming imaging systems.

Processes, techniques, apparatus, and materials as known by one of ordinary skill in the art may not be discussed in detail but are intended to be part of the enabling description where appropriate. For example lens and lens units are discussed and any material that can be used to form lenses should fall within the scope of exemplary embodiments (e.g., glass, Si). Additionally the actual size of the lens may not be discussed however any size from macro lenses to nano lenses are intended to lie within the scope of exemplary embodiments (e.g., lenses with diameters of nanometer size, micro size, centimeter size, and meter sizes).

Additionally exemplary embodiments are not limited to visual imaging devices (e.g., optical photographic systems), for example the system can be designed for use with infrared and other wavelength imaging systems. Additionally, exemplary embodiments can be used with non-digital systems as well as digital systems (e.g., photographic systems using CCDs).

Notice that similar reference numerals and letters refer to similar items in the following figures, and thus once an item is defined in one figure, it may not be discussed or further defined in the following figures.

Exemplary embodiments of a zoom lens system and an image pickup apparatus including the zoom lens system are described below.

Figure 1:
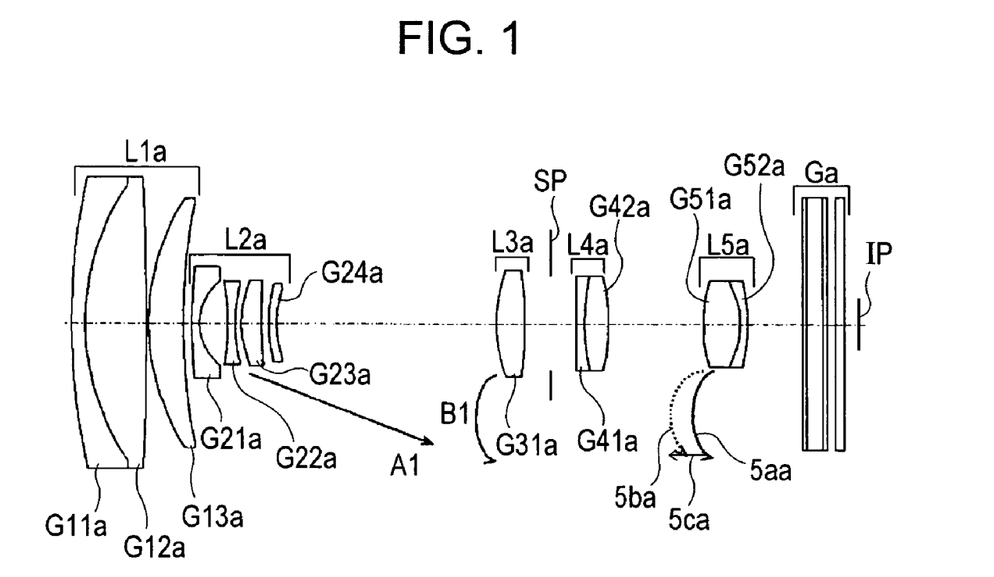
FIG. 1 illustrates a cross-sectional view of a zoom lens system according to a first exemplary embodiment.

FIG. 1 illustrates a cross-sectional view of the zoom lens system according to a first exemplary embodiment at the wide-angle end.

Figure 2A:
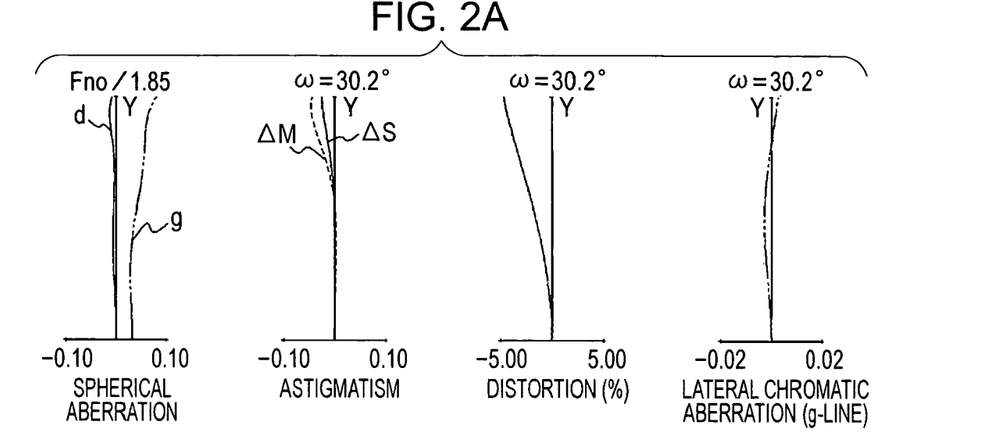
FIGS. 2A to 2C illustrate aberrations in the zoom lens system according to the first exemplary embodiment.
Figure 2B:
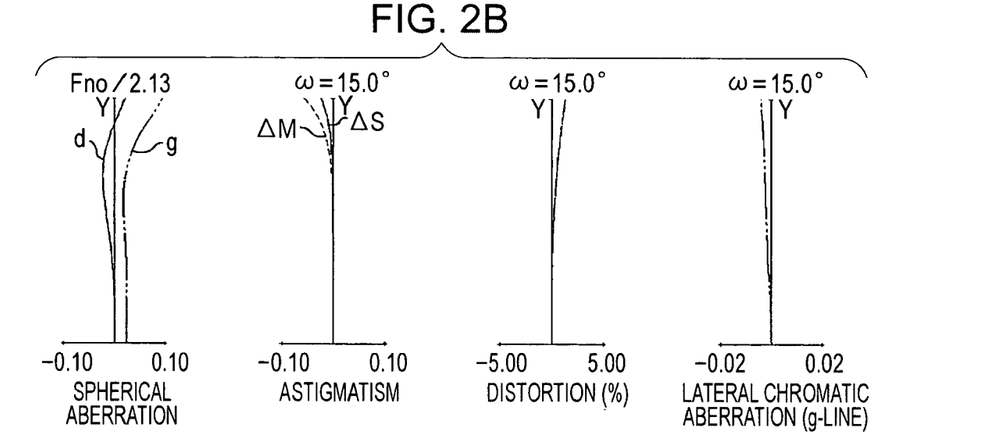
Figure 2C:
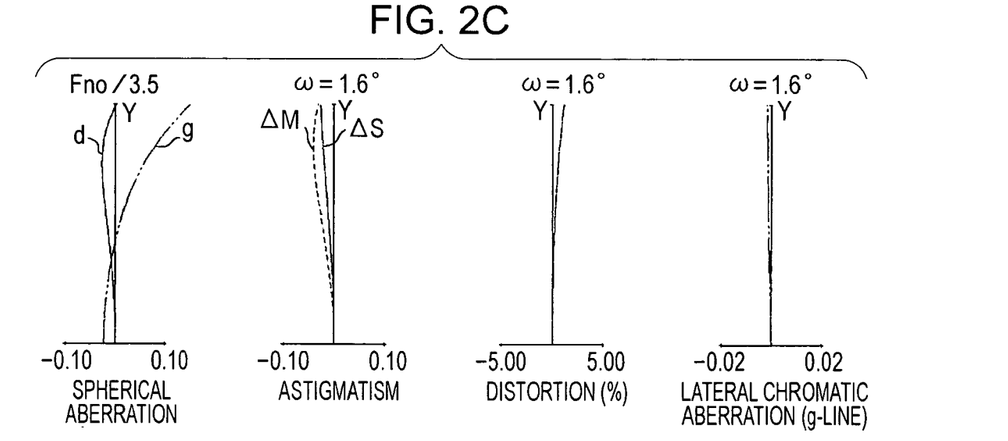

FIGS. 2A, 2B and 2C illustrate aberrations in the zoom lens system according to the first exemplary embodiment at the wide-angle end, at an intermediate zoom position, and at a telephoto end, respectively.

Figure 3:
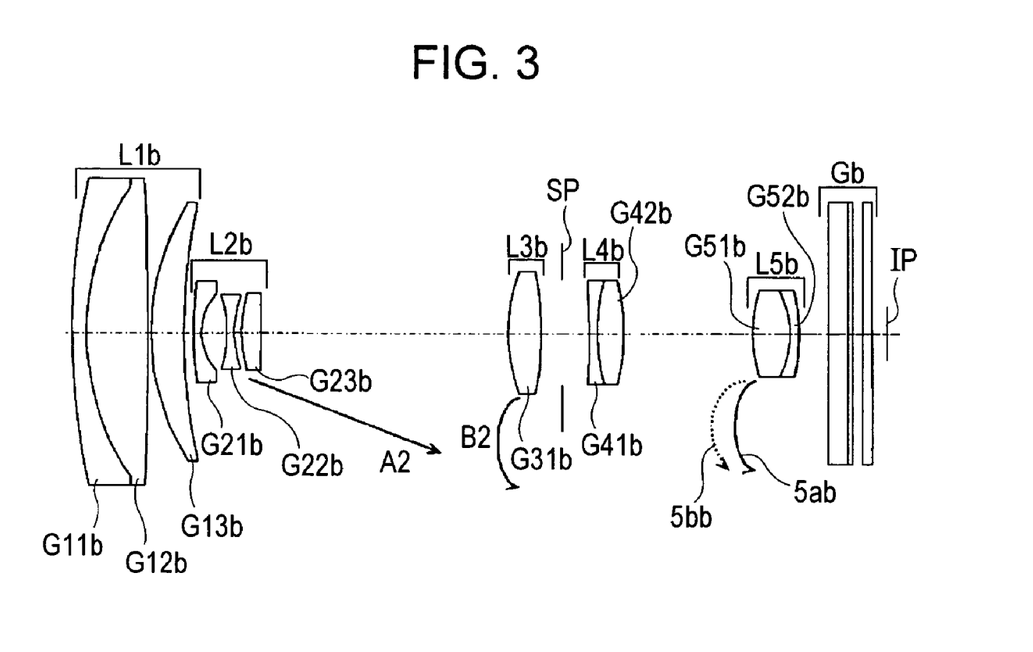
FIG. 3 illustrates a cross-sectional view of the zoom lens system according to a second exemplary embodiment.

FIG. 3 illustrates a cross-sectional view of the zoom lens system according to a second exemplary embodiment at the wide-angle end.

Figure 4A:
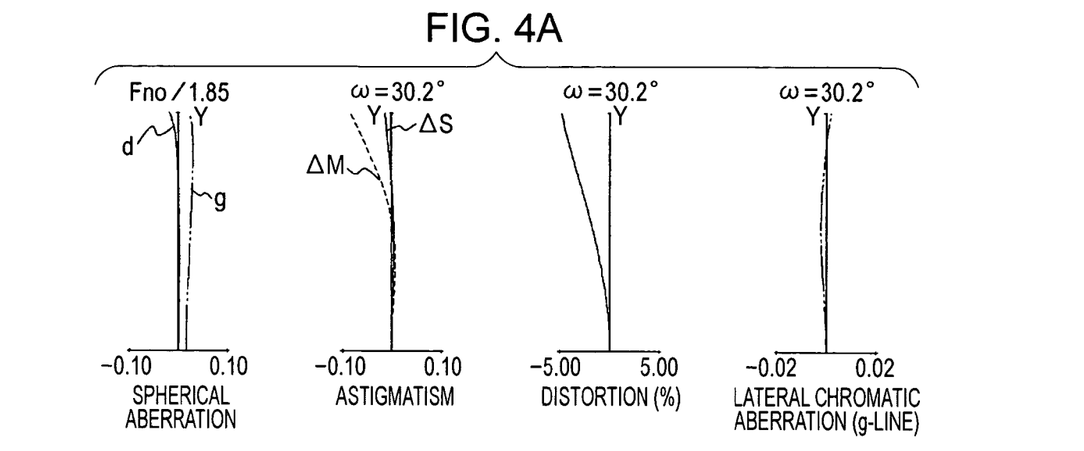
FIGS. 4A to 4C illustrate aberrations in the zoom lens system according to the second exemplary embodiment.
Figure 4B:
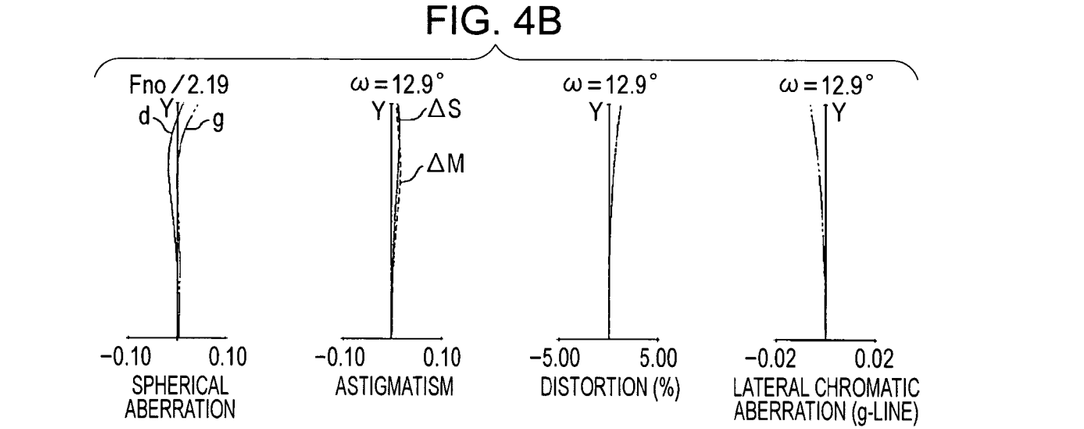
Figure 4C:
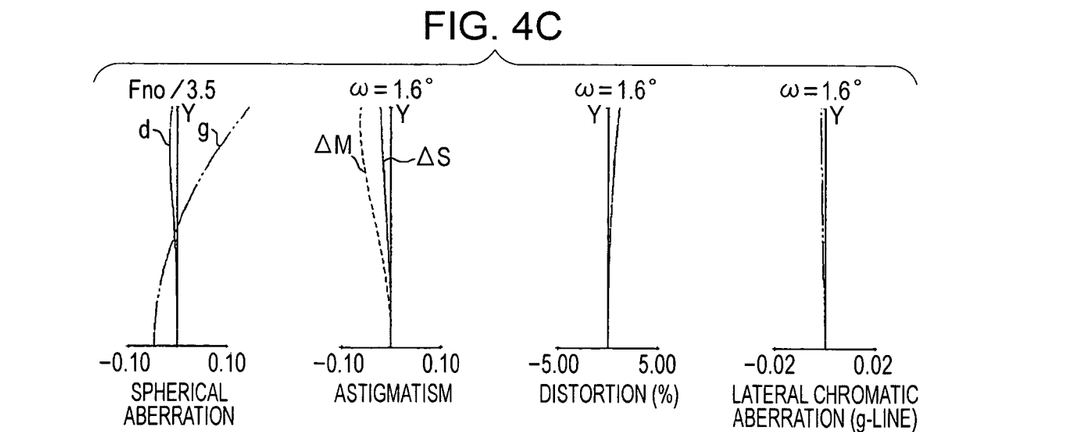

FIGS. 4A, 4B, and 4C illustrate aberrations in the zoom lens system according to the second exemplary embodiment at the wide-angle end, at the intermediate zoom position, and at the telephoto end, respectively.

Figure 5:
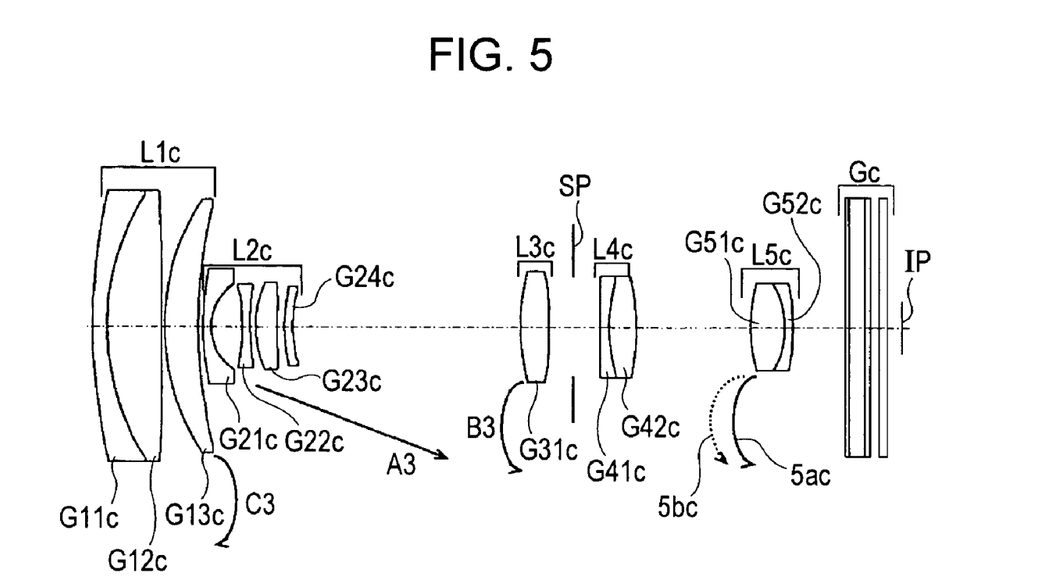
FIG. 5 illustrates a cross-sectional view of the zoom lens system according to a third exemplary embodiment.

FIG. 5 illustrates a cross-sectional view of the zoom lens system according to a third exemplary embodiment at the wide-angle end.

Figure 6A:
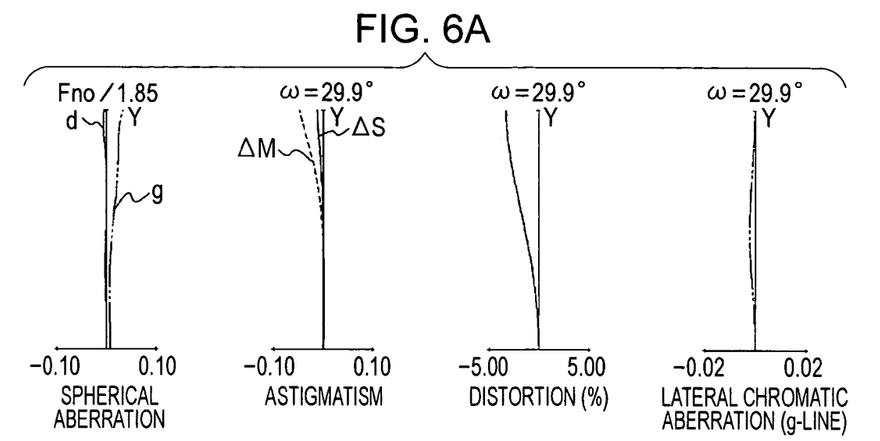
FIGS. 6A to 6C illustrate aberrations in the zoom lens system according to the third exemplary embodiment.
Figure 6B:
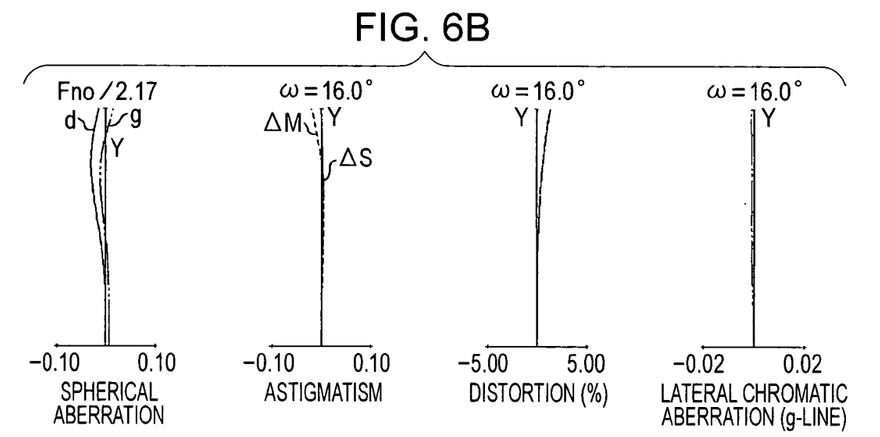
Figure 6C:
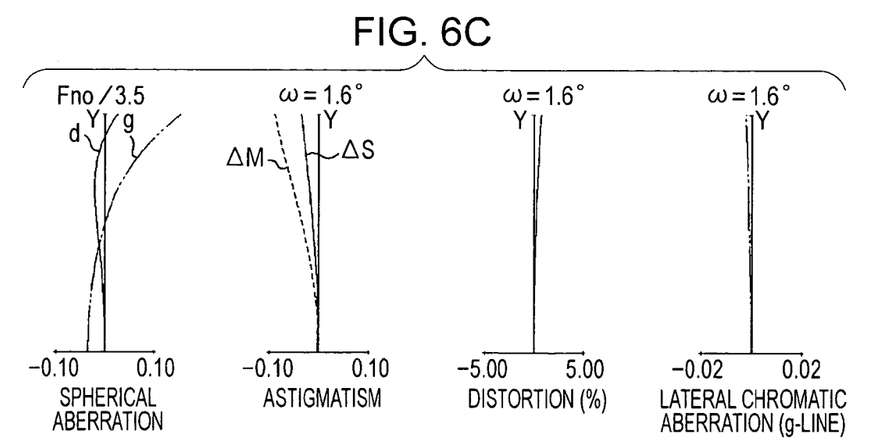

FIGS. 6A, 6B, and 6C illustrate aberrations in the zoom lens system according to the third exemplary embodiment at the wide-angle end, at the intermediate zoom position, and at the telephoto end, respectively.

Figure 7:
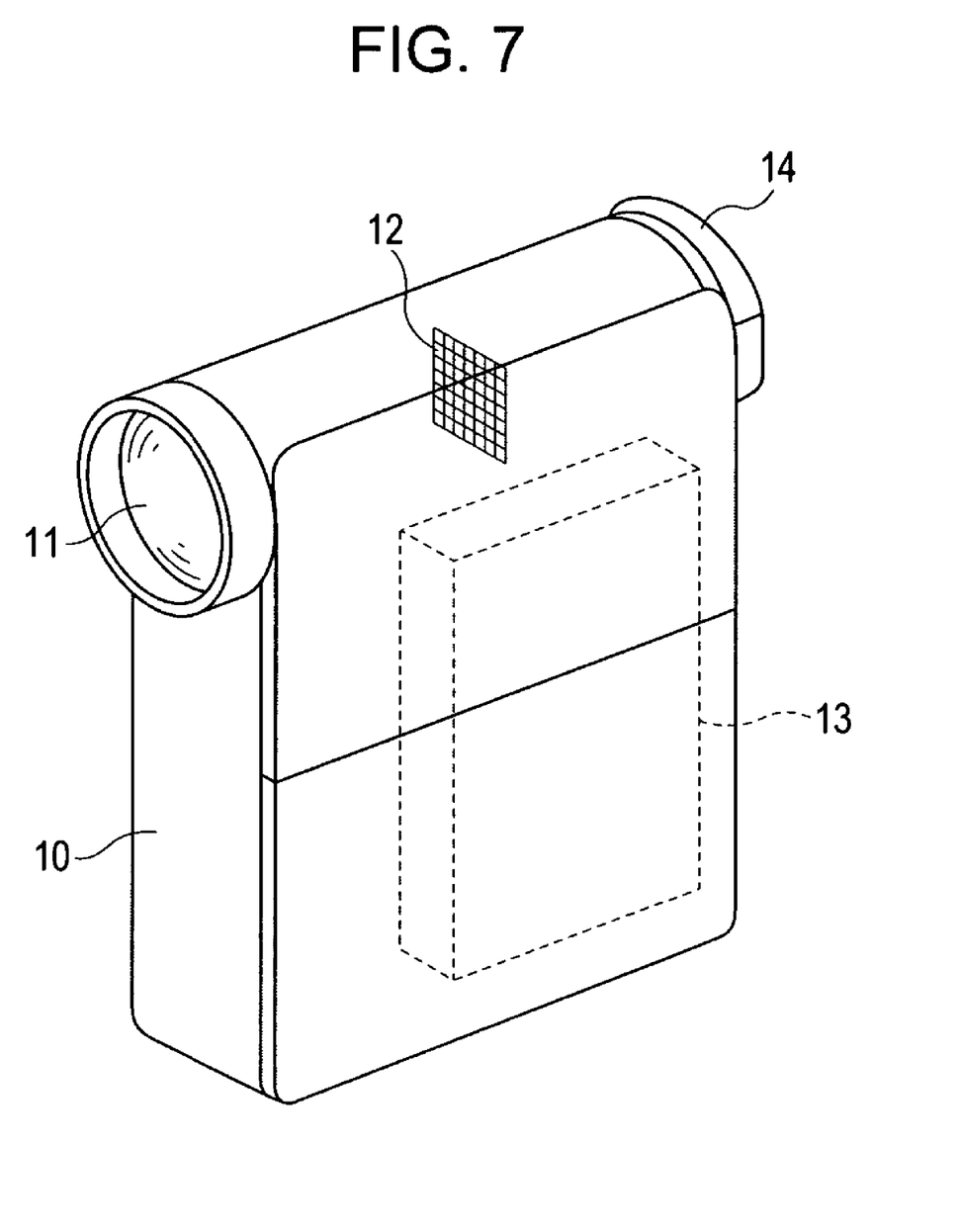
FIG. 7 illustrates a schematic view of an image pickup apparatus.

FIG. 7 is a schematic view of a camcorder (image pickup apparatus) including a zoom lens system in accordance with at least one exemplary embodiment.

The zoom lens system in each exemplary embodiment can be an image-capturing lens system used in the image pickup apparatus. In the cross-sectional views of the zoom lens system, the left side represents an object (subject) side (front) and the right side represents an image side (rear). As shown in the cross-sectional views of in FIGS. 1, 3, and 5, the zoom lens system includes a first lens unit (e.g., L1a-L1c) with positive refractive power (optical power: the reciprocal of its focal length), a second lens unit (e.g., L2a-L2c) with negative refractive power, a third lens unit (e.g., L3a-L3c) with positive refractive power, a fourth lens unit (e.g., L4a-L4c), and a fifth lens unit (e.g., L5a-L5c) with positive refractive power.

In the first and third exemplary embodiments (FIGS. 1 and 5), the fourth lens unit L4a,c has positive refractive power. In the second exemplary embodiment (FIG. 3), the fourth lens unit L4b has negative refractive power.

A fixed aperture stop SP is disposed at the object side with respect to the fourth lens unit L4a-c.

In at least one exemplary embodiment, the aperture stop SP does not move during zooming.

An optical block (e.g., Ga-Gc) functions as an optical filter, a faceplate, or other equivalent optical element as known by one of ordinary skill in the relevant art. In a case where the zoom lens system in accordance with at least one exemplary embodiment is used as an image-capturing optical system in an image pickup apparatus (e.g., a camcorder or a digital still camera), an image plane IP corresponds to an image pickup surface of a solid-state portion of an image pickup device (photoelectric conversion device) (e.g., a charge-coupled device (CCD) sensor, a complementary metal-oxide semiconductor (CMOS) sensor, other photoelectric conversion devices as known by one of ordinary skill in the relevant arts and equivalents). In a case where the zoom lens system in accordance with at least one exemplary embodiment is used as an image-capturing optical system in a film-based camera, the image plane IP corresponds to a film surface.

In the figures showing the aberrations, "Fno" denotes the F-number, "d" denotes the d-line, "g" denotes the g-line, $\omega$ denotes half of the angle of view, $\Delta M$ denotes a meridional plane, $\Delta S$ denotes a sagittal plane, and a lateral chromatic aberration is represented by the g-line.

In the exemplary embodiments described below, the wide-angle end and the telephoto end indicate the zoom positions when a lens unit, that functions to vary the magnification (e.g., the second lens unit L2a-c), lies at the both ends of a range in which the lens unit is mechanically movable (e.g., A1-A3) along the optical axis.

In the zoom lens system according to each of the exemplary embodiments, while zooming from the wide-angle end to the telephoto end, the second lens unit L2a-c is moved (e.g., A1-A3) toward the image side and the third lens unit L3a-c is moved (e.g., B1-B3) so as to exhibit part of a locus convex toward the object side, as indicated by the arrows.

The zoom lens system adopts a rear focusing system in which focusing is performed by moving the fifth lens unit L5a-c along the optical axis.

For example, at the telephoto end, focusing on from an object at infinity to an object at close range is performed by moving the fifth lens unit L5a toward the front, as indicated by a straight line 5ca in FIG. 1. A solid curve (e.g., 5aa-5ac and a dotted curve 5ba-5bc) in FIGS. 1, 3, and 5 represent the loci of the fifth lens unit L5a-c for compensating for displacements of an image occurring during zooming from the wide-angle end to the telephoto end. The solid curve 5aa-5ac represents the locus while the fifth lens unit L5a-c focuses on an object at infinity, and the dotted curve 5ba-5bc represents the locus while the fifth lens unit L5a-c focuses on an object at close range. In this way, the locus of the fifth lens unit L5a-c varies depending on the distance to the object. Moving the fifth lens unit L5a-c so as to exhibit part of a locus convex toward the object side along the optical axis facilitates effective use of a space between the fourth lens unit L4a-c and the fifth lens unit L5a-c, thus effectively reducing the entire length of the lens system.

In each of the exemplary embodiments, the effective diameter of a front lens (the first lens unit L1a-c) is determined by a zoom position with the intermediate focal length between the wide-angle end and the telephoto end.

Therefore, during zooming from the wide-angle end to the telephoto end, the third lens unit L3a-c is moved (e.g., B1-B3) so as to exhibit part of a locus convex toward the object side, thus facilitating a lack of increase in the effective diameter of the front lens.

In other words, the third lens unit L3a-c at the zoom position with the intermediate focal length is moved (e.g., B1-B3) so as to be nearer to the object side, so that an entrance pupil is moved so as to be nearer to the object side, thus facilitating a lack of increase in the effective diameter of the front lens.

In addition, the third lens unit L3a-c is moved in such a way that its position at the telephoto end is nearer to its position at the wide-angle end, so that the effectiveness of varying the magnification caused by the second lens unit L2a-c, which contributes largely to varying the magnification, is ensured. Therefore, a high zoom ratio is readily realized.

The aperture stop SP can be moved during zooming in the exemplary embodiments. However, in the non-limiting examples provided, the aperture stop SP is not moved during zooming.

For cases where the fourth lens unit L4a-c is movable during zooming and the distance between the fourth lens unit L4a-c and the third lens unit L3a-c is largely varied, large variations in the distance between the fourth lens unit L4a-c and the third lens unit L3a-c are related to large variations in the aberration in an afocal unit. In order to suppress the variations in the aberration caused by the variations in the distance, one can increase the number of lens elements (e.g., G31a-G31c, and G41a-G41c) of the third lens unit L3a-c and the fourth lens unit L4a-c or to use an aspheric lens element in these lens units.

For cases where the fourth lens unit L4a-c is moved during zooming while the distance between the third lens unit L3a-c and the fourth lens unit L4a-c is maintained, one can move the fourth lens unit L4a-c in such a way that the position of the fourth lens unit L4a-c in the vicinity of the telephoto end is nearer to the image side than the position of the fourth lens unit L4a-c at the zoom position with the intermediate focal length. To this end, when the fifth lens unit L5a-c is moved (e.g., 5aa) nearest to the object side in the vicinity of the telephoto end, a predetermined distance between the fourth lens unit L4a-c and the fifth lens unit L5a-c can be set. As a result, moving the fourth lens unit L4a-c during zooming can lead to an increase in the entire length of the lens system.

To avoid this, although the fourth lens unit can move in exemplary embodiments, in the examples of the exemplary embodiments discussed herein, the fourth lens unit L4a-c does not move during zooming and is disposed at a position adjacent to the aperture stop SP.

For cases where the fifth lens unit L5a-c does not move during zooming and compensation for displacements of an image while the magnification is varied and focusing are performed by moving the fourth lens unit L4a-c, the distance between the third lens unit L3a-c and the fourth lens unit L4a-c during zooming can be largely varied. To address this, as described above, one can increase the number of lens elements of the third lens unit L3a-c and the fourth lens unit L4a-c or use an aspheric lens element in these lens units. In at least one of the exemplary embodiments, to reduce the need for increasing the distance between the third lens unit and the fourth lens unit, focusing can be performed by moving the fifth lens unit L5a-c.

If chromatic aberration is not reduced sufficiently using the fourth lens unit L4a-c, the third lens unit L3a-c can be used to aid the reduction of the chromatic aberration. However, since the distance between the third lens unit L3a-c and the fourth lens unit L4a-c varies during zooming, variations in the chromatic aberration can be large. Thus, it can be difficult to reduce the chromatic aberration by a combination of these two lens units, L3a-c and L4a-c.

Therefore, in at least one exemplary embodiment, the fourth lens unit L4a-c is a combination lens (e.g., cemented lens) formed of a negative lens element G41a-c and a positive lens element G42a-c so that the chromatic aberration is reduced by the fourth lens unit L4a-c.

In the exemplary embodiments, the first lens unit L1a-c includes, in order from the object side to the image side, a lens element G11a-c with negative refractive power, a lens element G12a-c with positive refractive power, and a lens element G13a-c with positive refractive power. The lens elements G11a-c and G12a-c can make up a combination lens (e.g., cemented lens). The lens element G11a-c can be a meniscus lens whose object-side surface is convex. The lens element G13a-c can be a meniscus lens whose object-side surface is convex.

The second lens unit L2a-c includes three lens elements or four lens elements. For the three lens elements, the second lens unit L2b includes, in order from the object side to the image side, a lens element G21b with negative refractive power, a lens element G22b with negative refractive power, and a lens element G23b with positive refractive power. For the four lens elements, the second lens unit L2a,c includes the three lens elements described above (e.g., G21a,c, G22a, c, G23a,c) and a lens element G24a,c with negative refractive power disposed at the image side with respect to the lens element G23a,c. The lens element G21a-c can be a meniscus lens whose object-side surface is convex. The lens element G22a-c can be biconcave. The lens element G23a-c can have a convex object-side surface and the lens element G24a-c can have a concave image-side surface.

The third lens unit L3a-c includes a biconvex lens element G31a-c.

The fifth lens unit L5a-c includes a combination lens (e.g., cemented lens) formed of a lens element G51a-c with positive refractive power and a lens element G52a-c with negative refractive power. The lens element G51a-c can be biconvex. The lens element G52a-c can be a meniscus lens whose image-side surface is convex.

This structure of the fifth lens unit L5a-c reduces variations in aberration occurring when the fifth lens unit L5a-c is moved for focusing.

In the exemplary embodiments, specifying the refractive power of each lens unit and the conditions during zooming as described above facilitates the zoom lens system exhibiting an increased optical performance over the entire zoom range and for overall distances to an object. In addition, this facilitates the entire lens system to become more compact and the structure of the lens system to become simpler.

Next, conditions that are satisfied and can be satisfied in the zoom lens system according to at least one exemplary embodiment are described.

The following conditional expression (1) can be satisfied:

$$0.3 < D_{2m}/D_{2t} < 0.6 \quad (1)$$

where $D_{2m}$ is the amount of movement of the second lens unit L2a-c along the optical axis when the second lens unit L2a-c moves from the wide-angle end to a zoom position Za (the positive sign is present when the lens unit L2a-c is moved toward to the image side), the zoom position Za is a zoom position when the third lens unit L3a-c is disposed (e.g., B1-B3) nearest to the object side during zooming, and $D_{2t}$ is the amount of movement (e.g., A1-A3) of the second lens unit L2a-c when the second lens unit L2a-c moves from the wide-angle end to the telephoto end.

Conditional expression (1) is a condition for reducing the effective diameter of a front lens (the first lens unit L1a-c) while maintaining a sufficient zoom ratio. In order to suppress the variations in aberration during zooming, one can avoid sharply moving the third lens unit L3a-c. If, in conditional expression (1), $D_{2m}/D_{2t}$ exceeds the upper limit, the third lens unit L3a-c can interfere with the movement of the second lens unit L2a-c. Which can make it difficult to maintain a sufficient zoom ratio. By contrast, if $D_{2m}/D_{2t}$ is smaller than the lower limit, the third lens unit L3a-c at the wide-angle end can be disposed remotely from, the aperture stop SP on the object side with respect to the aperture stop SP and the focal length at the wide-angle end, thus it can approach the telephoto end (i.e., the focal length at the wide-angle end is increased). As a result, the zoom lens system can be hindered from increasing an angular field and obtaining a sufficient zoom ratio.

The numerical limitations of conditional expression (1) can be refined as follows:

$$0.35 < D_{2m}/D_{2t} < 0.5 \qquad (1a)$$

The following conditional expression (2) can be satisfied:

$$1.0 < (B_{13w} - B_2)/D_{2t} < 1.2 \qquad (2)$$

where $B_{13w}$ is the distance between the first lens unit L1a-c and the third lens unit L3a-c at the wide-angle end and $B_2$ is the distance between an object-side surface of the second lens unit L2a-c and an image-side surface of the second lens unit L2a-c, the object-side surface being nearest to the object side and the image-side surface being nearest to the image side in the second lens unit L2a-c.

Conditional expression (2) is a condition for maintaining a high zoom ratio. Moving the second lens unit L2a-c contributes to varying the magnification. However, if, in conditional expression (2), $(B_{13w}-B_2)/D_{2t}$ exceeds the upper limit, the third lens unit L3a-c reduces the amount of movement of the second lens unit L2a-c. This can make it difficult to efficiently obtain a high zoom ratio. By contrast, if $(B_{13w}-B_2)/D_{2t}$ is smaller than the lower limit, the distance between the first lens unit L1a-c and the second lens unit L2a-c at the wide-angle end, the distance between the second lens unit L2a-c and the third lens unit L3a-c at the telephoto end, and the distance between the third lens unit L3a-c and the aperture stop SP at the telephoto end are reduced. This can make it difficult to maintain a space sufficient for accommodating a lens barrel or a light-shielding member.

The numerical limitations of conditional expression (2) can be refined as follows:

$$1.01 < (B_{13w} - B_2)/D_{2t} < 1.15 \qquad (2a)$$

In the exemplary embodiments, an optical filter or a lens unit with small refractive power can be added to the object side with respect to the first lens unit L1a-c or the image side with respect to the fifth lens unit L5a-c.

In yet another exemplary embodiment, a teleconverter lens or a wide converter lens can be arranged at the object side or the image side.

First, second, and third numerical examples corresponding to the first, second, and third exemplary embodiments are shown below. In the numerical examples, f represents the focal length, Fno represents the F-number, and ω represents half of the angle of view. Additionally, i represents the order of a surface from the object side, Ri represents the radius of curvature of an i-th surface, Di represents the distance between the i-th surface and an (i+1)-th surface, Ni represents the refractive index of the i-th lens surface with respect to the d-line, and vdi represents the Abbe number of the i-th lens surface with respect to the d-line.

In the first to third numerical examples, seven surfaces disposed nearest to the image side are planes corresponding to the optical block Ga-c. The aspherical shape is represented by the following expression:

$$x = \frac{(1/R)h^2}{1 + \sqrt{\{1 - (1+k)(h/R)^2\}}} + Bh^4 + Ch^6 + Dh^8 + Eh^{10} + Fh^{12}$$

where x is the amount of displacements along the optical axis with respect to an apex at a height h from the optical axis, R is the paraxial radius of curvature, k is the conic constant, and B, C, D, E, and F are the aspheric coefficients for the respective terms.

In addition, "e-X" refers to "×10$^{-X}$".

The relationship between the conditional expressions described above and the numerical values in the numerical examples is shown in Table 1.

NUMERICAL EXAMPLE 1 f = 3.60 to 71.20  Fno = 1.85 to 3.50  2ω = 30.2° to 1.6°

| | | | |
|---|---|---|---|
| R1 = 56.063 | D1 = 1.10 | N1 = 1.846660 | v1 = 23.9 |
| R2 = 20.331 | D2 = 4.86 | N2 = 1.696797 | v2 = 55.5 |
| R3 = −276.129 | D3 = 0.20 | | |
| R4 = 19.608 | D4 = 2.71 | N3 = 1.834807 | v3 = 42.7 |
| R5 = 49.490 | D5 = variable | | |
| R6 = 58.061 | D6 = 0.60 | N4 = 1.882997 | v4 = 40.8 |
| R7 = 4.489 | D7 = 2.24 | | |
| R8 = −19.378 | D8 = 0.60 | N5 = 1.882997 | v5 = 40.8 |
| R9 = 17.686 | D9 = 0.50 | | |
| R10 = 8.598 | D10 = 1.68 | N6 = 1.922860 | v6 = 18.9 |
| R11 = 71.506 | D11 = 0.53 | | |
| R12 = 13.925 | D12 = 0.60 | N7 = 1.882997 | v7 = 40.8 |
| R13 = 9.594 | D13 = variable | | |
| R14 = 12.534 | D14 = 2.23 | N8 = 1.583126 | v8 = 59.4 |
| R15 = −36.763 | D15 = variable | | |
| R16 = stop | D16 = 2.07 | | |
| R17 = −86.765 | D17 = 0.60 | N9 = 1.846660 | v9 = 23.9 |
| R18 = 15.703 | D18 = 1.98 | N10 = 1.518229 | v10 = 58.9 |

-continued

| | | | |
|---|---|---|---|
| R19 = −16.628 | D19 = variable | | |
| R20 = 11.341 | D20 = 2.99 | N11 = 1.581439 | ν11 = 40.8 |
| R21 = −6.769 | D21 = 0.60 | N12 = 1.846660 | ν12 = 23.9 |
| R22 = −15.412 | D22 = variable | | |
| R23 = ∞ | D23 = 0.30 | N13 = 1.544000 | ν13 = 70.0 |
| R24 = ∞ | D24 = 1.20 | N14 = 1.514000 | ν14 = 60.0 |
| R25 = ∞ | D25 = 0.42 | N15 = 1.544000 | ν15 = 70.0 |
| R26 = ∞ | D26 = 0.70 | | |
| R27 = ∞ | D27 = 0.70 | N16 = 1.500000 | ν16 = 60.0 |
| R28 = ∞ | D28 = 1.19 | | |
| R29 = ∞ | | | |

| | Focal Length | | |
|---|---|---|---|
| Variable Distance | 3.60 | 7.54 | 71.20 |
| D5 | 0.75 | 7.84 | 18.48 |
| D13 | 17.73 | 10.09 | 0.79 |
| D15 | 2.08 | 2.64 | 1.30 |
| D19 | 7.58 | 4.90 | 10.30 |
| D22 | 4.45 | 7.13 | 1.73 |

Aspheric Coefficients

R14   k = 1.37063e−02   B = −1.72574e−04   C = 7.38704e−06   D = −1.06047e−06
      E = 6.48439e−08   F = −1.40426e−09

NUMERICAL EXAMPLE 2 f = 3.60 to 71.21  Fno = 1.85 to 3.50  2ω = 30.2° to 1.6°

| | | | |
|---|---|---|---|
| R1 = 57.250 | D1 = 1.10 | N1 = 1.846660 | ν1 = 23.9 |
| R2 = 20.429 | D2 = 4.86 | N2 = 1.696797 | ν2 = 55.5 |
| R3 = −251.049 | D3 = 0.20 | | |
| R4 = 19.394 | D4 = 2.54 | N3 = 1.834807 | ν3 = 42.7 |
| R5 = 47.723 | D5 = variable | | |
| R6 = 37.814 | D6 = 0.60 | N4 = 1.882997 | ν4 = 40.8 |
| R7 = 4.599 | D7 = 1.96 | | |
| R8 = −10.908 | D8 = 0.60 | N5 = 1.882997 | ν5 = 40.8 |
| R9 = 9.775 | D9 = 0.50 | | |
| R10 = 10.214 | D10 = 1.57 | N6 = 1.922860 | ν6 = 18.9 |
| R11 = −60.996 | D11 = variable | | |
| R12 = 13.102 | D12 = 2.60 | N7 = 1.583126 | ν7 = 59.4 |
| R13 = −20.795 | D13 = variable | | |
| R14 = stop | D14 = 2.11 | | |
| R15 = −80.516 | D15 = 0.60 | N8 = 1.846660 | ν8 = 23.9 |
| R16 = 15.401 | D16 = 2.03 | N9 = 1.518229 | ν9 = 58.9 |
| R17 = −18.147 | D17 = variable | | |
| R18 = 11.304 | D18 = 2.91 | N10 = 1.581439 | ν10 = 40.8 |
| R19 = −6.791 | D19 = 0.60 | N11 = 1.846660 | ν11 = 23.9 |
| R20 = −16.371 | D20 = variable | | |
| R21 = ∞ | D21 = 0.30 | N12 = 1.544000 | ν12 = 70.0 |
| R22 = ∞ | D22 = 1.20 | N13 = 1.514000 | ν13 = 60.0 |
| R23 = ∞ | D23 = 0.42 | N14 = 1.544000 | ν14 = 70.0 |
| R24 = ∞ | D24 = 0.70 | | |
| R25 = ∞ | D25 = 0.70 | N15 = 1.500000 | ν15 = 60.0 |
| R26 = ∞ | D26 = 1.19 | | |
| R27 = ∞ | | | |

| | Focal Length | | |
|---|---|---|---|
| Variable Distance | 3.60 | 8.66 | 71.21 |
| D5 | 0.75 | 9.47 | 18.92 |
| D11 | 19.07 | 9.73 | 1.03 |
| D13 | 1.60 | 2.22 | 1.47 |
| D17 | 10.07 | 6.00 | 10.65 |
| D20 | 2.34 | 6.41 | 1.77 |

Aspheric Coefficients

R14   k = 9.53172e−01   B = −2.45509e−04   C = 3.84100e−06   D = −4.36992e−07
      E = 1.93367e−08   F = −3.14843e−10

NUMERICAL EXAMPLE 3

| f = 3.60 to 71.20 Fno = 1.85 to 3.50 2ω = 29.9° to 1.6° | | | |
|---|---|---|---|
| R1 = 49.643 | D1 = 1.10 | N1 = 1.846660 | ν1 = 23.9 |
| R2 = 20.293 | D2 = 4.25 | N2 = 1.696797 | ν2 = 55.5 |
| R3 = −282.663 | D3 = 0.20 | | |
| R4 = 18.571 | D4 = 2.64 | N3 = 1.804000 | ν3 = 46.6 |
| R5 = 41.963 | D5 = variable | | |
| R6 = 27.302 | D6 = 0.60 | N4 = 1.882997 | ν4 = 40.8 |
| R7 = 4.164 | D7 = 2.45 | | |
| R8 = −16.016 | D8 = 0.60 | N5 = 1.882997 | ν5 = 40.8 |
| R9 = 19.330 | D9 = 0.50 | | |
| R10 = 9.019 | D10 = 1.64 | N6 = 1.922860 | ν6 = 18.9 |
| R11 = 95.084 | D11 = 0.57 | | |
| R12 = 14.985 | D12 = 0.60 | N7 = 1.834000 | ν7 = 37.2 |
| R13 = 10.483 | D13 = variable | | |
| R14 = 17.404 | D14 = 2.24 | N8 = 1.583126 | ν8 = 59.4 |
| R15 = −23.178 | D15 = variable | | |
| R16 = stop | D16 = 2.13 | | |
| R17 = −891.975 | D17 = 0.60 | N9 = 1.846660 | ν9 = 23.9 |
| R18 = 14.695 | D18 = 2.18 | N10 = 1.517417 | ν10 = 52.4 |
| R19 = −15.927 | D19 = variable | | |
| R20 = 14.659 | D20 = 2.63 | N11 = 1.622992 | ν11 = 58.2 |
| R21 = −7.342 | D21 = 0.60 | N12 = 1.806100 | ν12 = 33.3 |
| R22 = −17.649 | D22 = variable | | |
| R23 = ∞ | D23 = 0.30 | N13 = 1.544000 | ν13 = 70.0 |
| R24 = ∞ | D24 = 1.20 | N14 = 1.514000 | ν14 = 60.0 |
| R25 = ∞ | D25 = 0.42 | N15 = 1.544000 | ν15 = 70.0 |
| R26 = ∞ | D26 = 0.70 | | |
| R27 = ∞ | D27 = 0.70 | N16 = 1.500000 | ν16 = 60.0 |
| R28 = ∞ | D28 = 1.19 | | |
| R29 = ∞ | | | |

| | Focal Length | | |
|---|---|---|---|
| Variable Distance | 3.60 | 6.88 | 71.20 |
| D5 | 0.38 | 5.60 | 17.89 |
| D13 | 17.79 | 8.63 | 1.00 |
| D15 | 1.89 | 3.22 | 1.26 |
| D19 | 8.86 | 5.18 | 11.82 |
| D22 | 4.11 | 7.79 | 1.15 |

Aspheric Coefficients

R14  k = 1.78298e+00  B = −2.00006e−04  C = 6.16221e−06  D = −8.48480e−07
     E = 4.96148e−08  F = −1.03752e−09

TABLE 1

| Conditional Expression | Numerical Example | | |
|---|---|---|---|
| | 1 | 2 | 3 |
| (1) | 0.39 | 0.48 | 0.45 |
| (2) | 1.04 | 1.09 | 1.04 |

An exemplary embodiment of a camcorder (image pickup apparatus) using a zoom lens system according to at least one exemplary embodiment as an image-capturing optical system is described below with reference to FIG. 7.

In FIG. 7, the camcorder includes a camcorder body 10, an image-capturing optical system 11 includes a zoom lens system in accordance with at least one exemplary embodiment, a solid-state image pickup device (photoelectric conversion device) 12 (e.g., a CCD sensor) for receiving an object's image through the image-capturing optical system 11, a memory 13 for recording information corresponding to the object's image subjected to photoelectrical conversion processed by the solid-state image pickup device 12, and a viewfinder 14 used for observing the object's image displayed on a display device (not shown). The viewfinder (display device) can be made up of a liquid-crystal display panel or other display device and displays the object's image formed on the solid-state image pickup device 12.

As described above, a zoom lens system in accordance with at least one exemplary embodiment is applied to the image pickup apparatus (e.g., camcorder), thus facilitating the compact image pickup apparatus with increased optical performance.

A zoom lens system in accordance with at least one exemplary embodiment is also applicable to a digital still camera.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-380724 filed Dec. 28, 2004, which is hereby incorporated by reference herein in its entirety.

What is claim is:

1. A zoom lens system comprising, in order from an object side to an image side:
   a first lens unit with positive optical power;
   a second lens unit with negative optical power, the second lens unit moving along an optical axis during zooming;
   a third lens unit with positive optical power, the third lens unit moving along the optical axis during zooming;
   a fourth lens unit;
   a fifth lens unit with positive optical power, the fifth lens unit moving along the optical axis during zooming,
   wherein a distance between the first lens unit and the second lens unit, a distance between the second lens unit and the third lens unit, a distance between the third lens unit and the fourth lens unit, and a distance between the fourth lens unit and the fifth lens unit vary during zooming; and
   an aperture stop disposed at the object side with respect to the fourth lens unit,
   wherein the aperture stop does not move for zooming.

2. The zoom lens system according to claim 1, wherein the fifth lens unit moves during focusing.

3. The zoom lens system according to claim 1, wherein the fourth lens unit includes a negative lens element and a positive lens element.

4. The zoom lens system according to claim 1, wherein the third lens unit moves along the optical axis so as to exhibit a locus convex toward the object side during zooming from a wide-angle end to a telephoto end, and the following condition is satisfied:

$$0.3 < D_{2m}/D_{2t} < 0.6$$

where $D_{2m}$ is the amount of movement of the second lens unit when the second lens unit moves from the wide-angle end to a zoom position Za, the zoom position Za is a zoom position when the third lens unit is disposed nearest to the object side during the zooming, and $D_{2t}$ is the amount of movement of the second lens unit when the second lens unit moves from the wide-angle end to the telephoto end.

5. The zoom lens system according to claim 1, wherein the following condition is satisfied:

$$1.0 < (B_{13w} - B_2)/D_{2t} < 1.2$$

where $B_{13w}$ is the distance between the first lens unit and the third lens unit at the wide-angle end, $B_2$ is the distance between an object-side surface of the second lens unit and an image-side surface of the second lens unit, the object-side surface being nearest to the object side and the image-side surface being nearest to the image side in the second lens unit, and $D_{2t}$ is the amount of movement of the second lens unit when the second lens unit moves from the wide-angle end to the telephoto end.

6. The zoom lens system according to claim 1, wherein the zoom lens system forms an image on a solid-state image pickup device.

7. An image pickup apparatus comprising:
   the zoom lens system according to claim 1; and
   a solid-state image pickup device configured to receive an image formed by the zoom lens system.

8. The zoom lens system according to claim 1, wherein the fourth lens unit has a positive optical power.

9. The zoom lens system according to claim 1, wherein the second lens unit includes:
   a first lens element with negative optical power;
   a second lens element with negative optical power; and
   a third lens element with positive optical power.

10. The zoom lens system according to claim 9, wherein the second lens unit further includes:
    a fourth lens element with negative optical power.

11. The zoom lens system according to claim 1, wherein the first lens unit includes:
    a first lens element with negative optical power;
    a second lens element with positive optical power; and
    a third lens element with positive optical power,
    wherein the first lens element and the second lens element are operatively connected in a combination lens.

12. A zoom lens system comprising, in order from an object side to an image side:
    a first lens unit with positive optical power;
    a second lens unit with negative optical power, the second lens unit moving along an optical axis during zooming;
    a third lens unit with positive optical power, the third lens unit moving along the optical axis during zooming;
    a fourth lens unit; and
    a fifth lens unit with positive optical power, the fifth lens unit moving along the optical axis during zooming,
    wherein a distance between the first lens unit and the second lens unit, a distance between the second lens unit and the third lens unit, a distance between the third lens unit and the fourth lens unit, and a distance between the fourth lens unit and the fifth lens unit vary during zooming and wherein the fifth lens unit moves during focusing.

13. The zoom lens system according to claim 12, wherein the zoom lens system forms an image on a solid-state image pickup device.

14. An image pickup apparatus comprising:
    the zoom lens system according to claim 12; and
    a solid-state image pickup device configured to receive an image formed by the zoom lens system.

15. A zoom lens system comprising, in order from an object side to an image side:
    a first lens unit with positive optical power;
    a second lens unit with negative optical power, the second lens unit moving along an optical axis during zooming;
    a third lens unit with positive optical power, the third lens unit moving along the optical axis during zooming;
    a fourth lens unit; and
    a fifth lens unit with positive optical power, the fifth lens unit moving along the optical axis during zooming,
    wherein a distance between the first lens unit and the second lens unit, a distance between the second lens unit and the third lens unit, a distance between the third lens unit and the fourth lens unit, and a distance between the fourth lens unit and the fifth lens unit vary during zooming wherein the third lens unit moves along the optical axis so as to exhibit a locus convex toward the object side during zooming from a wide-angle end to a telephoto end, and
    the following condition is satisfied:

$$0.3 < D_{2m}/D_{2t} < 0.6$$

where $D_{2m}$ is the amount of movement of the second lens unit when the second lens unit moves from the wide-angle end to a zoom position Za, the zoom position Za is a zoom position when the third lens unit is disposed nearest to the object side during the zooming, and $D_{2t}$ is the amount of movement of the second lens unit when the second lens unit moves from the wide-angle end to the telephoto end.

16. The zoom lens system according to claim 15, wherein the zoom lens system forms an image on a solid-state image pickup device.

17. An image pickup apparatus comprising:
the zoom lens system according to claim 15, and
a solid-state image pickup device configured to receive an image formed by the zoom lens system.

18. A zoom lens system comprising, in order from an object side to an image side:
a first lens unit with positive optical power;
a second lens unit with negative optical power, the second lens unit moving along an optical axis during zooming;
a third lens unit with positive optical power, the third lens unit moving along the optical axis during zooming;
a fourth lens unit; and
a fifth lens unit with positive optical power, the fifth lens unit moving along the optical axis during zooming,
wherein a distance between the first lens unit and the second lens unit, a distance between the second lens unit and the third lens unit, a distance between the third lens unit and the fourth lens unit, and a distance between the fourth lens unit and the fifth lens unit vary during zooming wherein the following condition is satisfied:

$$1.0 < (B_{13w} - B_2)/D_{2t} < 1.2$$

where $B_{13w}$ is the distance between the first lens unit and the third lens unit at the wide-angle end, $B_2$ is the distance between an object-side surface of the second lens unit and an image-side surface of the second lens unit, the object-side surface being nearest to the object side and the image-side surface being nearest to the image side in the second lens unit, and $D_{2t}$ is the amount of movement of the second lens unit when the second lens unit moves from the wide-angle end to the telephoto end.

19. The zoom lens system according to claim 18, wherein the zoom lens system forms an image on a solid-state image pickup device.

20. An image pickup apparatus comprising:
the zoom lens system according to claim 18; and
a solid-state image pickup device configured to receive an image formed by the zoom lens system.

* * * * *